United States Patent
Nishida et al.

(10) Patent No.: US 12,131,760 B2
(45) Date of Patent: Oct. 29, 2024

(54) DISK DRIVE SUSPENSION

(71) Applicant: NHK SPRING CO., LTD., Yokohama (JP)

(72) Inventors: Tatsuhiko Nishida, Yokohama (JP); Masao Hanya, Yokohama (JP)

(73) Assignee: NHK SPRING CO., LTD., Tokyo (JP)

( * ) Notice: Subject to any disclaimer, the term of this patent is extended or adjusted under 35 U.S.C. 154(b) by 0 days.

(21) Appl. No.: 18/340,030

(22) Filed: Jun. 23, 2023

(65) Prior Publication Data
US 2023/0419991 A1     Dec. 28, 2023

(30) Foreign Application Priority Data
Jun. 23, 2022  (JP) ................................ 2022-100824

(51) Int. Cl.
*G11B 5/48*     (2006.01)

(52) U.S. Cl.
CPC .......... *G11B 5/4833* (2013.01); *G11B 5/4846* (2013.01)

(58) Field of Classification Search
None
See application file for complete search history.

(56) References Cited

U.S. PATENT DOCUMENTS

| | | |
|---|---|---|
| 8,363,361 B2 | 1/2013 | Hanya et al. |
| 8,717,713 B1 * | 5/2014 | Bjorstrom ............ G11B 5/4873 360/245.9 |
| 8,804,266 B2 | 8/2014 | Hanya et al. |
| 8,854,770 B2 | 10/2014 | Nishida et al. |
| 8,934,203 B2 | 1/2015 | Hanya et al. |
| 8,941,953 B2 | 1/2015 | Nishida et al. |
| 8,947,833 B2 | 2/2015 | Hanya et al. |
| 8,964,334 B2 | 2/2015 | Takikawa et al. |
| 8,970,990 B2 | 3/2015 | Takikawa et al. |
| 9,042,056 B2 | 5/2015 | Hanya et al. |
| 10,748,565 B1 | 8/2020 | Nakayama et al. |
| 11,170,822 B2 | 11/2021 | Nakayama et al. |
| 11,410,707 B2 | 8/2022 | Nakayama et al. |
| 2001/0043443 A1 | 11/2001 | Okamoto et al. |
| 2002/0075605 A1 * | 6/2002 | Nishida ................ G11B 5/5552 |
| 2002/0075606 A1 * | 6/2002 | Nishida ................ G11B 5/5552 |
| 2002/0097528 A1 * | 7/2002 | Williams ............. G11B 5/5552 |
| 2009/0086379 A1 * | 4/2009 | Hanya .................. G11B 5/4873 |

(Continued)

FOREIGN PATENT DOCUMENTS

| | | |
|---|---|---|
| JP | 2002050140 A | 2/2002 |
| JP | 2011216160 A | 10/2011 |

(Continued)

*Primary Examiner* — William J Klimowicz
(74) *Attorney, Agent, or Firm* — Holtz, Holtz & Volek PC

(57) ABSTRACT

A suspension includes a first actuator arrangement portion and a second actuator arrangement portion. The first actuator arrangement portion includes a load beam frame portion formed of a part of the load beam. Both ends of a first actuator element are supported by the load beam frame portion. The second actuator arrangement portion includes a second load beam frame portion formed of a part of the load beam and a thin plate frame portion formed of a metal base of a flexure. One end of the second actuator element is supported by the second load beam frame portion. The other end of the second actuator element is supported by the thin plate frame portion.

4 Claims, 9 Drawing Sheets

(56) References Cited

U.S. PATENT DOCUMENTS

| | | | | |
|---|---|---|---|---|
| 2010/0195252 A1* | 8/2010 | Kashima | .............. | G11B 5/4873 |
| | | | | 29/25.35 |
| 2010/0246071 A1* | 9/2010 | Nojima | ................ | G11B 5/4833 |
| 2010/0290158 A1* | 11/2010 | Hanya | ................... | G11B 5/4873 |
| 2011/0058282 A1* | 3/2011 | Fujimoto | ............ | G11B 5/4833 |
| | | | | 360/246.2 |
| 2011/0141624 A1* | 6/2011 | Fuchino | ............... | G11B 5/4873 |
| | | | | 29/603.07 |
| 2011/0216446 A1* | 9/2011 | Iriuchijima | .......... | G11B 5/4873 |
| | | | | 29/25.35 |
| 2011/0242708 A1 | 10/2011 | Fuchino | | |
| 2011/0249366 A1 | 10/2011 | Fujimoto et al. | | |
| 2014/0362467 A1* | 12/2014 | Nojima | ................ | G11B 5/4873 |
| | | | | 360/97.13 |
| 2016/0086625 A1* | 3/2016 | Berscheit | ............... | G11B 5/483 |
| | | | | 360/294.4 |
| 2023/0117866 A1 | 4/2023 | Nishida et al. | | |
| 2023/0154490 A1 | 5/2023 | Hanya et al. | | |
| 2023/0197109 A1 | 6/2023 | Nishida et al. | | |

FOREIGN PATENT DOCUMENTS

| | | | | | |
|---|---|---|---|---|---|
| JP | 2011238323 | A | * | 11/2011 | ............. G11B 5/486 |
| JP | 4993524 | B2 | | 8/2012 | |
| JP | 2014053053 | A | * | 3/2014 | ........... G11B 5/1272 |

* cited by examiner

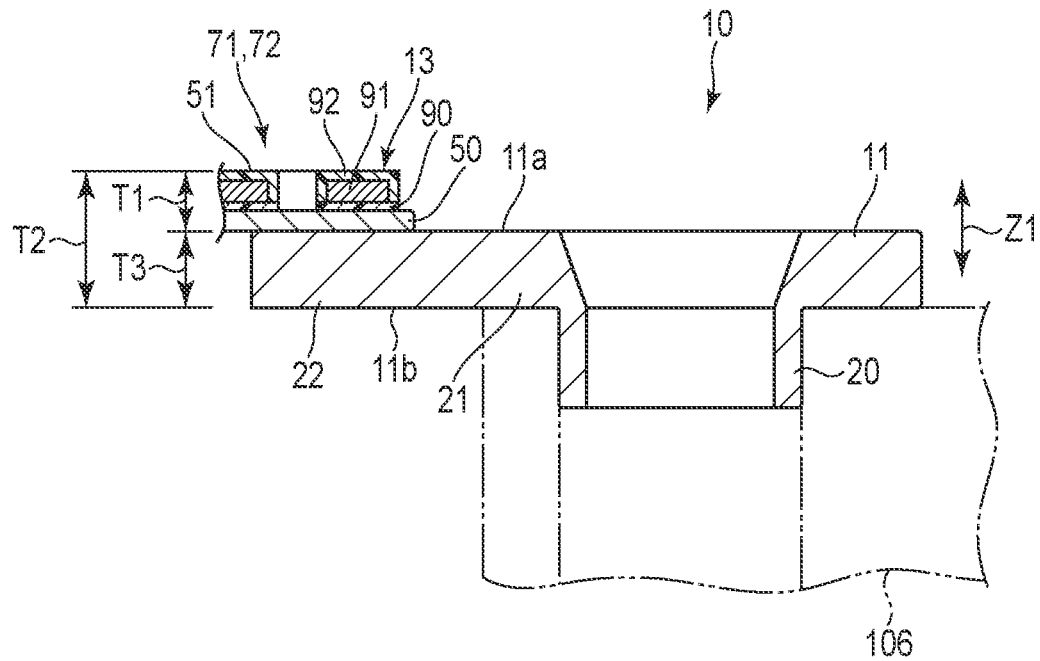
F I G. 5
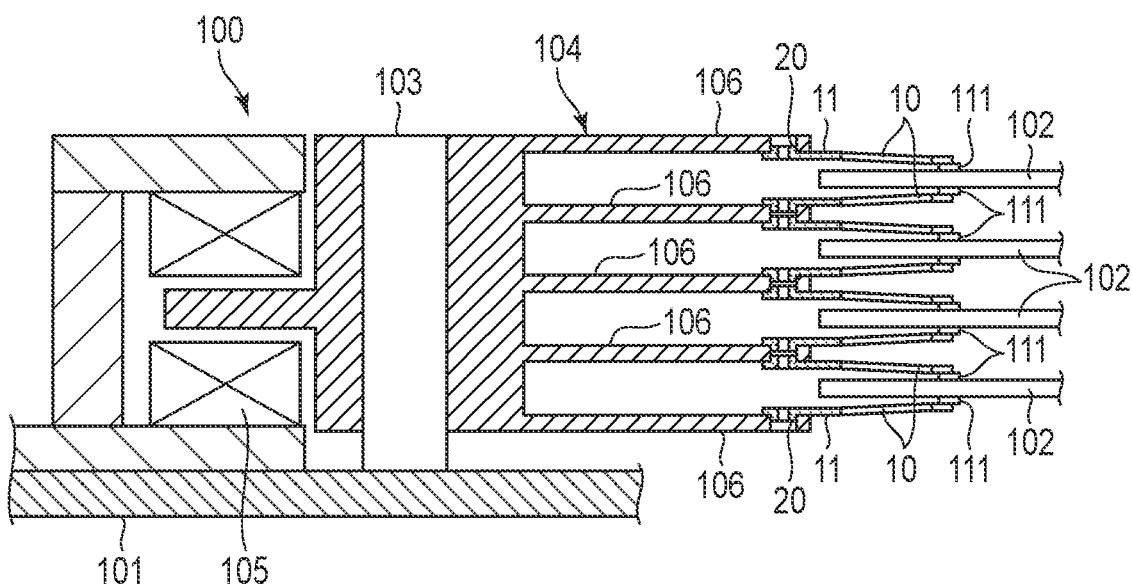
F I G. 6

DISK DRIVE SUSPENSION

CROSS-REFERENCE TO RELATED APPLICATIONS

This application is based upon and claims the benefit of priority from prior Japanese Patent Application No. 2022-100824, filed Jun. 23, 2022, the entire contents of which are incorporated herein by reference.

BACKGROUND OF THE INVENTION

1. Field of the Invention

The present invention relates to a disk drive suspension comprising an actuator arrangement portion for mounting an actuator element.

2. Description of the Related Art

A disk drive is used in an information processing apparatus such as a personal computer. The disk drive includes a magnetic disk rotatable about a spindle, a carriage pivotable about a pivot, and the like. A disk drive suspension is provided on an arm of the carriage.

The disk drive suspension comprises a baseplate, a load beam, a flexure arranged along the load beam and the like. A slider is provided on a gimbal portion formed near a distal end of the flexure. The slider is provided with elements for accessing data, that is, for reading or writing data stored in a disk.

In order to increase recording density of the disk, a magnetic head needs to be positioned more quickly and precisely relative to a recording surface of the disk. Further, as disclosed in JP 2002-50140 A (Patent Literature 1), JP 2011-216160 A (Patent Literature 2), and JP 4993524 B (Patent Literature 3), a suspension comprising a piezoelectric body is known. The piezoelectric body functions as an actuator element.

The actuator element is arranged on an actuator arrangement portion in the suspension. For example, an actuator housing portion is formed on the baseplate and the actuator element is arranged on the actuator housing portion. The actuator element is mounted on a frame portion formed of a part of the load beam. The actuator element is fixed to the frame portion and the like by means of an adhesive.

In conventional suspensions, the baseplate, the frame portion which is a part of the load beam, and the flexure overlap each other in the thickness direction in the actuator arrangement portion. The flexure includes a metal base and a wiring portion which is arranged along the metal base. Therefore, in the suspension comprising the actuator arrangement portion, the actuator arrangement portion tends to be larger in thickness than other portions.

As a method for increasing the amount of data recorded in the disk drive, it is effective to increase the number of disks built in the disk drive. However, when the actuator arrangement portion is large in thickness, the suspensions adjacent in the thickness direction may interfere each other. Therefore, the number of suspensions provided in the carriage and the number of the disks are limited. When a part of the frame portion serving as the actuator arrangement portion is arranged outside the actuator element, a stroke of the actuator element may be reduced due to the rigidity of the frame portion.

The present invention described herein aims to provide the disk drive suspension comprising the actuator arrangement portion and capable of reducing the thickness of the actuator arrangement portion.

BRIEF SUMMARY OF THE INVENTION

A suspension of an embodiment includes a baseplate, a load beam fixed to the baseplate, a flexure along the load beam, a first actuator arrangement portion and a second actuator arrangement portion. A first actuator element is provided on the first actuator arrangement portion. A second actuator element is provided on the second actuator arrangement portion.

The flexure includes a metal base smaller than the load beam in thickness, and a wiring portion arranged along the metal base. At least one of the first actuator arrangement portion and the second actuator arrangement portion includes a thin plate frame portion formed of a part of the metal base of the flexure. The thin plate frame portion is arranged on a position not overlapping the load beam. The thin plate frame portion supports the first actuator element or the second actuator element.

An embodiment of the present invention can reduce the thickness of the actuator arrangement portion in the disk drive suspension comprising the actuator element.

In the suspension of the present embodiment, the first actuator arrangement portion may include a first thin plate frame portion and a second thin plate frame portion. The first thin plate frame portion is formed of a part of the metal base and supports both ends of the first actuator element. The second actuator arrangement portion is formed of a part of the metal base and supports both ends of the second actuator element.

The first thin plate frame portion may include a first slit enabling the first actuator element to extend and retract. The second thin plate frame portion may include a second slit enabling the second actuator element to extend and retract. The first thin plate frame portion may include a first curved portion enabling the first actuator element to extend and retract. The second thin plate frame portion may include a second curved portion enabling the second actuator element to extend and retract.

The first actuator arrangement portion may include a first load beam frame portion formed of a part of the load beam. The first load beam frame portion supports both ends of the first actuator element. The second actuator arrangement portion may include the thin plate frame portion supporting one end of the second actuator element, and a second load beam frame portion. The second load beam frame portion is formed of a part of the load beam and supports the other end of the second actuator element.

The first load beam frame portion may include a first supporting portion supporting one end of the first actuator element, a second supporting portion supporting the other end of the actuator element, and an opening formed between the first supporting portion and the second supporting portion. A terminal line of the wiring portion may be arranged in the opening. The first load beam frame portion may include a connecting portion connecting the first supporting portion and the second supporting portion.

The suspension of one embodiment may include a first slit formed in the first load beam frame portion, and a second slit formed between the thin plate frame portion and the second load beam frame portion. The first load beam frame portion may include a curved portion enabling the first actuator element to extend and retract.

The first load beam frame portion may include a first supporting portion supporting one end of the first actuator element, and a second supporting portion supporting the other end of the first actuator element. A thin portion may be formed between the first supporting portion and the second supporting portion, and the terminal line of the wiring portion may be arranged on the thin portion. The terminal line may not include the metal base. The first load beam frame portion includes a part overlapping the terminal line of the wiring portion, and the terminal line may not include the metal base.

The flexure may include a first terminal provided on one side of the wiring portion and a second terminal provided on the other side of the wiring portion. The first terminal protrudes toward one side of the flexure. The second terminal protrudes toward the other side of the flexure. Preferably, these first terminal and the second terminal are arranged at positions different from each other in the longitudinal direction of the flexure.

The load beam may include a first surface and a second surface opposite to the first surface. The flexure may include a first portion and a second portion. The first portion overlaps with the first surface. The second portion passes through an opening of the load beam, protrudes toward the second surface and overlaps with the baseplate.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 5 is a cross-sectional view schematically showing the baseplate and a part of the flexure of the suspension.

FIG. 6 is a cross-sectional view showing an example of a disk drive.

DETAILED DESCRIPTION OF THE INVENTION

First Embodiment

Figures 1, 2:
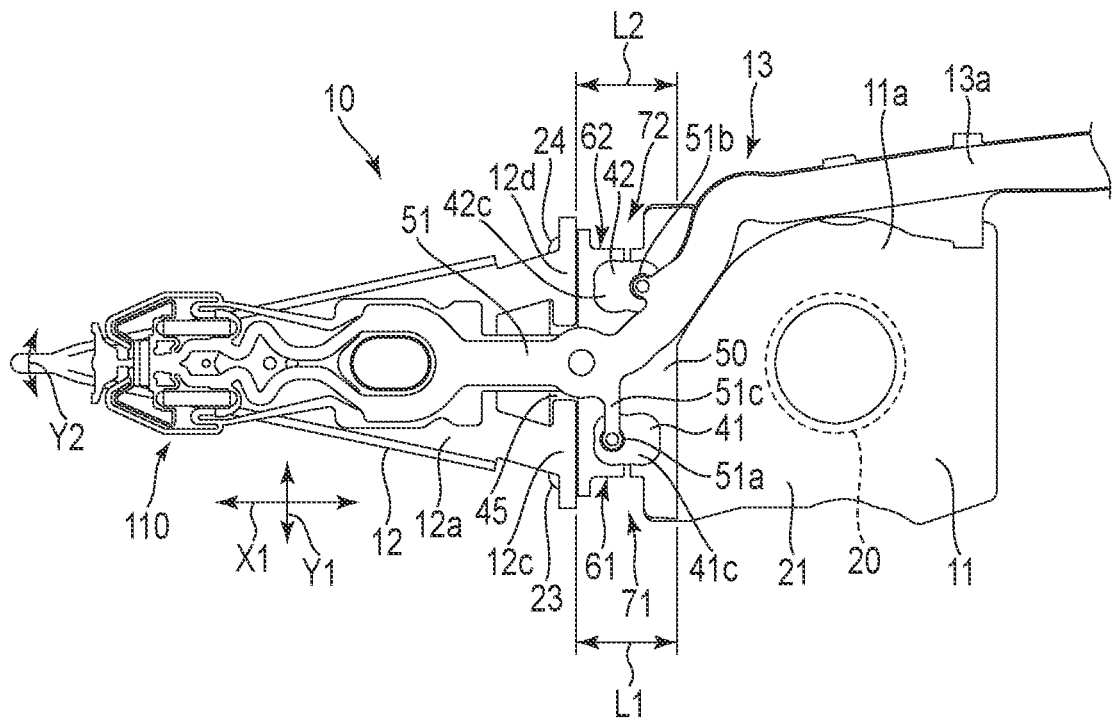
FIG. 1 is a plan view showing a disk drive suspension according to a first embodiment.
FIG. 2 is a plan view showing a baseplate and a load beam of the suspension.

A disk drive suspension according to a first embodiment will be described hereinafter with reference to FIGS. 1 to 6. In the specification, the disk drive suspension may also be simply referred to as a suspension. FIG. 1 is a plan view showing a suspension Double-headed arrow X1 in FIG. 1 indicates a longitudinal direction of the suspension 10. Double-headed arrow Y1 in FIG. 1 indicates a lateral direction of the suspension 10.

Figure 3:
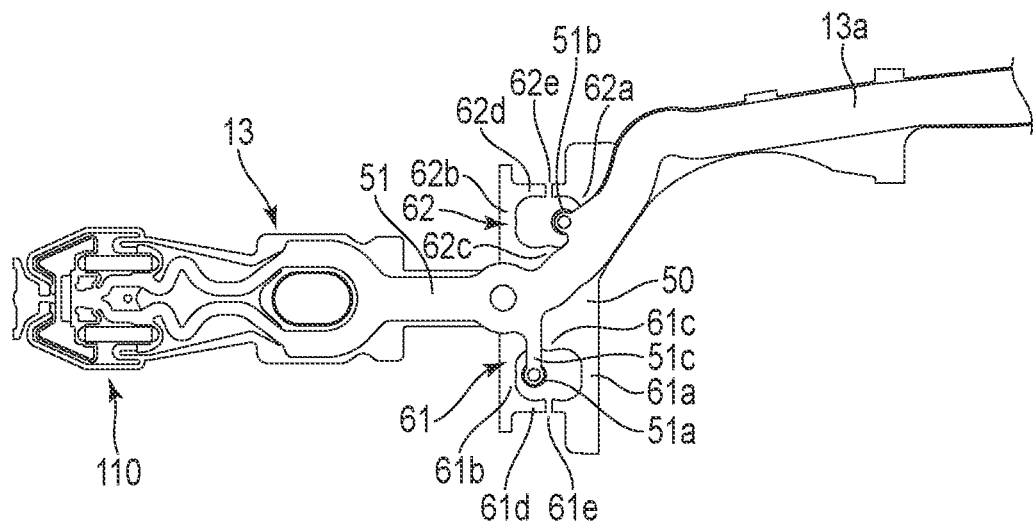
FIG. 3 is a plan view showing a flexure of the suspension.
Figure 4:
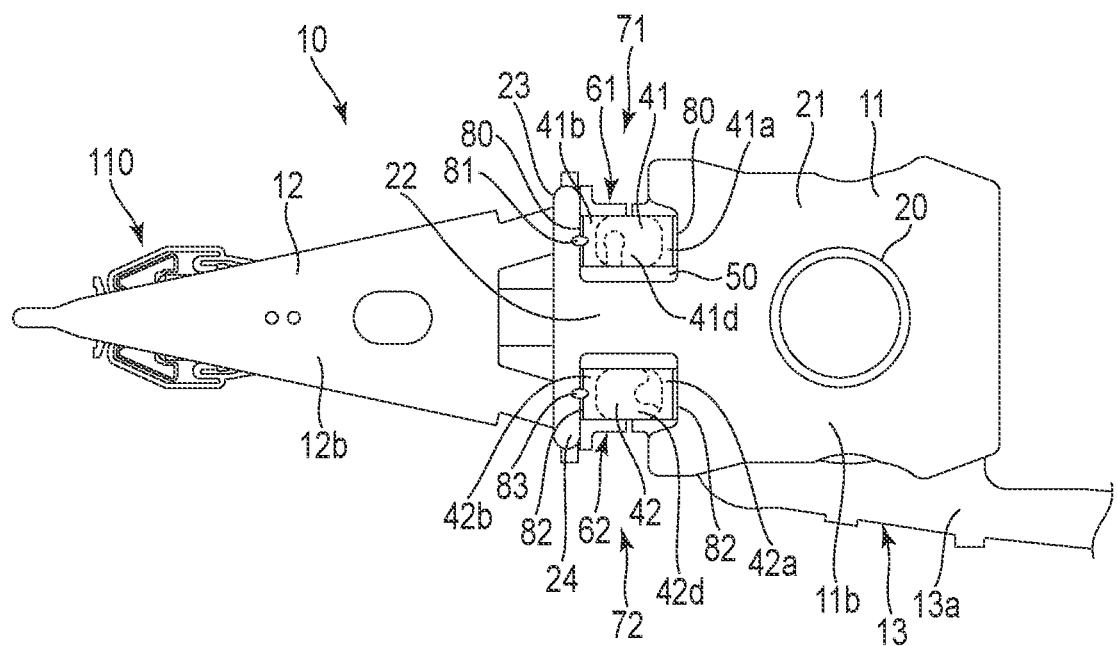
FIG. 4 is a plan view showing the suspension viewed from the side opposite to FIG. 1.

The suspension 10 includes a baseplate 11, a load beam 12, and a flexure 13. FIG. 2 is a plan view showing the baseplate 11 and the load beam 12. FIG. 3 is a plan view showing the flexure 13. FIG. 4 is a plan view of the suspension 10 as seen from the side opposite to FIG. 1. The load beam 12 includes a first surface 12a on which the flexure 13 is provided, and a second surface 12b opposite to the first surface 12a.

The baseplate 11 is formed of, for example, a plate of stainless steel. The baseplate 11 includes a plate body portion 21, a neck portion 22, a first extending portion 23, and a second extending portion 24. The plate body portion 21 includes a boss portion 20 that has a round shape. The neck portion 22 extends in a direction from the plate body portion 21 to the load beam 12. Each of the first extending portion 23 and the second extending portion 24 is formed at a distal end of the neck portion 22. Each of the first extending portion 23 and the second extending portion 24 extends in a lateral direction from the neck portion 22 to the suspension 10.

The thickness of the baseplate 11 is, for example, 100 to 300 μm. However, the thickness may be other than the above. The load beam 12 is formed of a sheet of stainless steel thinner than the baseplate 11. The load beam 12 extends in the longitudinal direction of the suspension 10. The thickness of the load beam 12 is, for example, 20 to 40 μm. However, the thickness may be other than the above.

An opening serving as a first actuator housing portion 31 is defined by the plate body portion 21, the neck portion 22 and the first extending portion 23. An opening serving as a second actuator housing portion 32 is defined by the plate body portion 21, the neck portion 22 and the second extending portion 24. A first actuator element 41 (illustrated in FIGS. 1 and 4) is housed in the first actuator housing portion 31. A second actuator element 42 is housed in the second actuator housing portion 32.

Each of the actuator elements 41 and 42 is formed of a piezoelectric body such as piezoelectric zirconate titanate (PZT). When a voltage is applied to the actuator elements 41 and 42, the piezoelectric body extends and retracts in accordance with the applied voltage. For this reason, a distal end side of the suspension 10 can be finely moved in the lateral direction of the suspension 10. The lateral direction of the suspension 10 is also a sway direction indicated by the double-headed arrow Y2 in FIG. 1.

As shown in FIG. 2, a pair of proximal portions 12c and 12d of the load beam 12 overlap with the extending portions 23 and 24 of the baseplate 11, respectively. The proximal portions 12c and 12d are fixed to the extending portions 23 and 24, respectively, by fixing means such as laser spot welding. An opening 45 on which a part of the flexure 13 is arranged is formed between the proximal portions 12c and 12d of the load beam 12.

The flexure 13 extends along the load beam 12 in the longitudinal direction of the suspension 10. The flexure 13 includes a metal base (metal sheet) 50 and a wiring portion 51. The metal base 50 is formed of a stainless-steel plate which is thinner than the load beam 12. The wiring portion 51 is arranged on the surface of the metal base 50. The metal base 50 has a thickness of, for example, 20 μm (12 to 25 μm). However, the thickness may be other than the above. A flexure tail 13a is formed at a rear part of the flexure 13. The flexure tail 13a extends to a rear side of the baseplate 11.

In a planar view of the flexure 13 shown in FIGS. 1 and 3, a first thin plate frame portion 61 and a second thin plate frame portion 62 are formed on the metal base 50 of the flexure 13. Each of the first thin plate frame portion 61 and the second thin plate frame portion 62 is formed of a part of the metal base 50. A first actuator arrangement portion 71 is formed by the first thin plate frame portion 61 and the first actuator housing portion 31. In FIG. 1, L1 represents the length of the first actuator arrangement portion 71. A second actuator arrangement portion 72 is formed by the second thin plate frame portion 62 and the second actuator housing portion 32. In FIG. 1, L2 represents the length of the second actuator arrangement portion 72.

The first thin plate frame portion 61 formed of the metal base 50 is arranged inside the first actuator housing portion 31. In the first actuator arrangement portion 71, the metal base 50 overlaps with the first surface 11a of the baseplate 11. As shown in FIG. 4, the first thin plate frame portion 61 includes a portion 61a supporting one end 41a of the first actuator element 41 and a portion 61b supporting the other end 41b of the first actuator element 41. The first thin plate frame portion 61 further includes an inside portion 61c and an outside portion 61d. A first slit 61e enabling the actuator element 41 to extend and retract is formed on the outside portion 61d.

The one end 41a of the first actuator element 41 is fixed to the plate body portion 21 and the portion 61a on the one end side of the first thin plate frame portion 61 by means of an adhesive 80. The other end 41b of the first actuator element 41 is fixed to the first extending portion 23 and the portion 61b on the other end side of the first thin plate frame portion 61 by means of the adhesive 80. The adhesive 80 is electrically insulated.

The second thin plate frame portion 62 formed of the metal base 50 is arranged inside the second actuator housing portion 32. In the second actuator arrangement portion 72, the metal base 50 overlaps with the first surface 11a of the baseplate 11. As shown in FIG. 4, the second thin plate frame portion 62 includes a portion 62a supporting one end 42a of the second actuator element 42 and a portion 62b supporting the other end 42b of the second actuator element 42. The second thin plate frame portion 62 further includes an inside portion 62c and an outside portion 62d. A second slit 62e enabling the actuator element 42 to extend and retract is formed on the outside portion 62d.

An end 42a of the second actuator element 42 is fixed to the plate body portion 21 and the portion 62a on the one end side of the second thin plate frame portion 62 by means of an adhesive 82. The other end 42b of the second actuator element 42 is fixed to the second extending portion 24 and the portion 62b on the other end side of the second thin plate frame portion 62 by means of the adhesive 82. The adhesive 82 is electrically insulated.

As shown in FIG. 1, one electrode 41c of the first actuator element 41 is connected to a first terminal 51a of the wiring portion 51. The first terminal 51a is connected to a terminal line 51c which is branched from the wiring portion 51. As shown in FIG. 4, the other electrode 41d of the first actuator element 41 is connected to the baseplate 11 via an electrically conductive adhesive 81. The baseplate 11 is electrically on the earth side.

As shown in FIG. 1, one electrode 42c of the second actuator element 42 is connected to a second terminal 51b of the wiring portion 51. As shown in FIG. 4, the other electrode 42d of the second actuator element 42 is connected to the baseplate 11 via an electrically conductive adhesive 83.

FIG. 5 schematically shows cross-sections of the baseplate 11 and a part of the flexure 13. The baseplate 11 includes the first surface 11a and a second surface 1ib. The wiring portion 51 includes a base insulating layer 90, a conductor 91, a cover resin 92 and the like. The base insulating layer 90 is formed on the surface of the metal base 50. Each of the base insulating layer 90 and the cover resin 92 is formed of an electrically insulating resin, such as polyimide and the like. The conductor 91 is formed of metal materials such as copper. A part of the metal base 50 is fixed to the first surface 11a of the baseplate 11.

Double-headed arrow Z1 in FIG. 5 indicates the thickness direction of the suspension 10. The thickness T1 of the flexure 13 is a sum of the thickness of the metal base 50 and the thickness of the wiring portion 51. The thickness T2 of the actuator arrangement portions 71 and 72 is a sum of the thickness T1 of the flexure 13 and the thickness T3 of the baseplate 11.

In an example of the actuator arrangement portion for the conventional suspension, a frame portion supporting the actuator was formed of a part of the load beam 12. In this case, the thickness of the actuator arrangement portion is a sum of the thickness of the flexure and the thickness of the load beam. Therefore, the thickness of the actuator arrangement portion tends to be large.

On the other hand, the actuator arrangement portions 71 and 72 of the suspension according to the present embodiment are formed of the thin plate frame portions 61 and 62, respectively. Each of the thin plate frame portions 61 and 62 is formed on a part of the metal base 50 of the flexure 13. The thickness of the metal base 50 is smaller than that of the load beam 12. Further, there is no load beam 12 in the actuator arrangement portions 71 and 72. The opening 45 through which the flexure 13 is passed is formed between the proximal portions 12c and 12d of the load beam 12.

The actuator arrangement portions 71 and 72 of the present embodiment are formed of the thin plate frame portions 61 and 62 composed of the metal bases 50, respectively. Furthermore, in the actuator arrangement portions 71 and 72, the load beam 12 and the flexure 13 do not overlap with each other. Therefore, the thickness T2 of the actuator arrangement portions 71 and 72 could be made smaller than those of conventional portions.

FIG. 6 is a cross-sectional view schematically showing an example of a disk drive 100. The disk drive 100 comprises a casing 101 (partially shown), a disk 102, a carriage 104, a positioning motor 105, and the like. The disk 102 is rotatable about a spindle. The carriage 104 is turned around a pivot 103 by the positioning motor 105. The casing 101 is sealed by a lid (not shown).

As shown in FIG. 6, the boss portion 20 of the baseplate 11 is fixed to an arm 106 of the carriage 104. As shown in FIGS. 1 and 3, a gimbal portion 110 is formed near the distal end of the suspension 10. At the gimbal portion 110, a slider 111 (shown in FIG. 6) which functions as a magnetic head is provided. The slider 111 is provided with an element for magnetically recording data on the disk 102, an element for reading data recorded on the disk 102, and the like.

When the disk 102 rotates at a high speed, an air bearing is formed between the disk 102 and the slider 111. If the carriage 104 is turned by the positioning motor 105, the suspension 10 moves in a radial direction of the disk 102. The slider 111 is thereby moved to a desired position of the disk 102. When a voltage is applied to the actuator elements 41 and 42, the actuator elements 41 and 42 extend and retract. For this reason, the slider 111 can be moved precisely at a high speed in the sway direction (indicated by double-headed arrow Y2 in FIG. 1).

According to the suspension 10 of the present embodiment, the actuator arrangement portions 71 and 72 could be made thinner than conventional products. As a result, in the disk drive including the plurality of disks 102 as shown in FIG. 6, the distance between the disks 102 adjacent to each other can be reduced. Therefore, the number of disks 102 built in a single disk drive can be increased.

Second Embodiment

Figure 7:
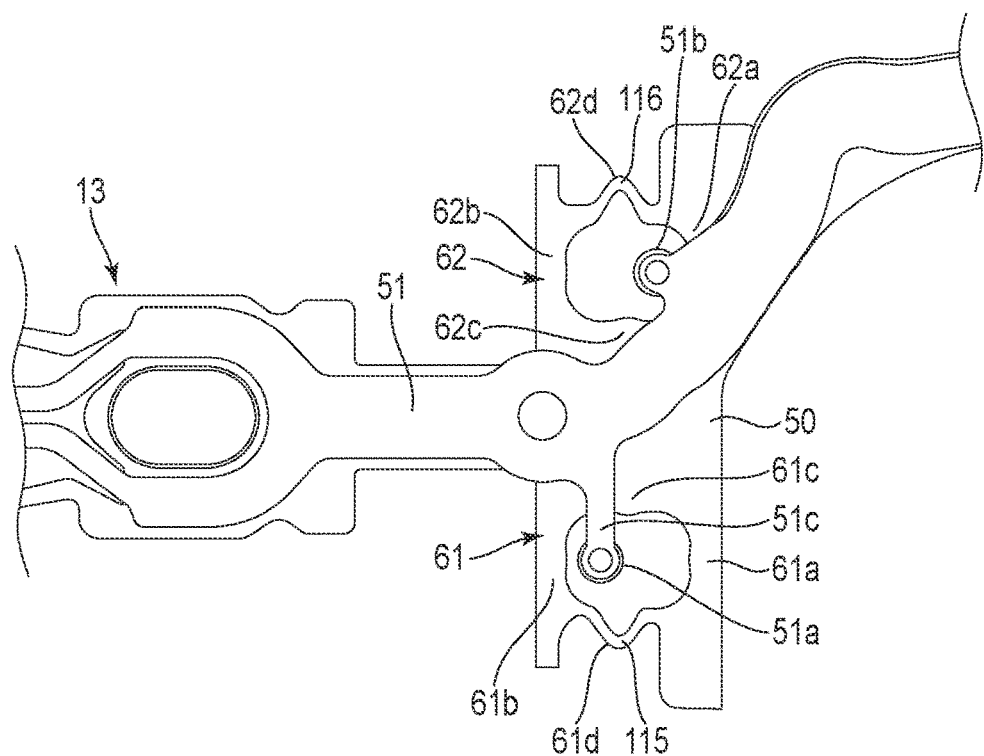
FIG. 7 is a plan view showing a part of a flexure of a suspension according to a second embodiment.

FIG. 7 is a plan view showing a portion of a flexure 13 of a suspension of a second embodiment. The flexure 13 shown in FIG. 7 is different from the flexure 13 of the first embodiment (shown in FIG. 3) in a shape of an outside portion 61d of a first thin plate frame portion 61 and a shape of an outside portion 62d of a second thin plate frame portion 62. Since structures other than these are common to the structures of the flexure 13 of the first embodiment, portions common to the two embodiments are denoted by common reference numerals and their descriptions are omitted.

The outside portion 61d of the first thin plate frame portion 61 shown in FIG. 7 includes a first curved portion 115. The first curved portion 115 comprises a function to enable the first actuator element 41 (shown in FIG. 4) to extend and retract. The outside portion 62d of the second thin plate frame portion 62 includes a second curved portion 116. The second curved portion 116 comprises a function to enable the second actuator element 42 (shown in FIG. 4) to extend and retract. Each of the first curved portion 115 and the second curved portion 116 has an outwardly convex shape (for example, V-shape, U-shape, Ω-shape, or the like). The flexure 13 of the present embodiment includes the curved portions 115 and 116. According to this, deformation of the thin plate frame portions 61 and 62 occurring during manufacturing could be suppressed without affecting strokes of the actuator elements 41 and 42.

Third Embodiment

A suspension 10A according to a third embodiment will be described hereinafter with reference to FIGS. 8 to 11. With respect to this suspension 10A, portions common to those of the suspension 10 (FIGS. 1 to 6) of the first embodiment are denoted by the reference numerals common to those of the first embodiment and their descriptions will be omitted. The portions which are different from those of the suspension 10 will be described hereinafter.

Figure 8:
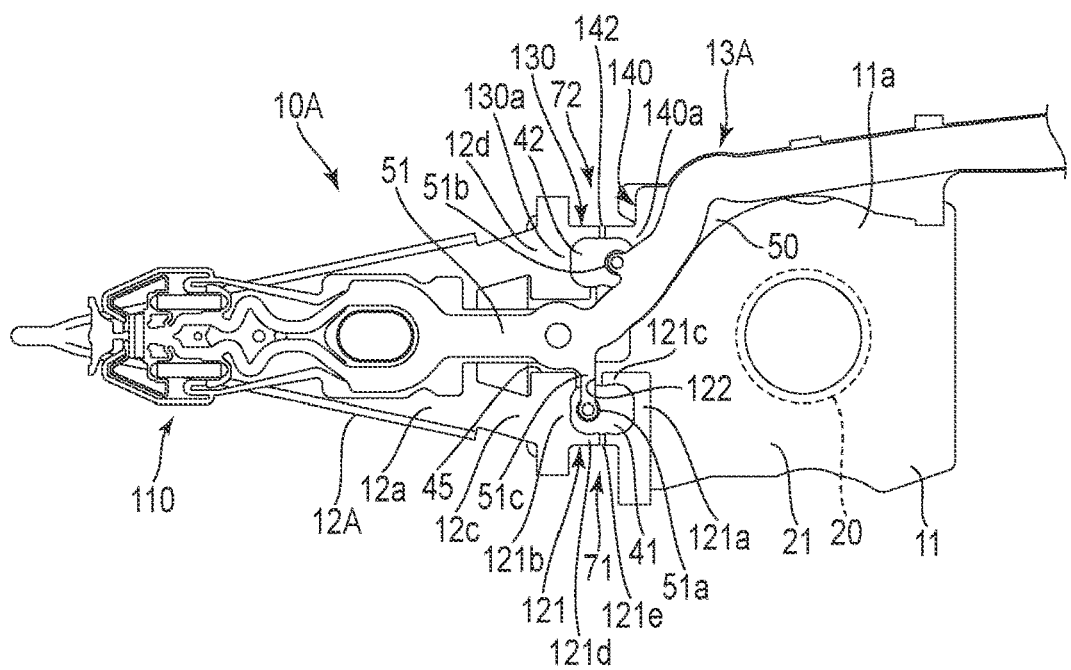
FIG. 8 is a plan view showing a suspension according to a third embodiment.

FIG. 8 is a plan view showing the suspension 10A. The suspension 10A includes a baseplate 11, a load beam 12A, and a flexure 13A. The baseplate 11 is configured similarly to the baseplate 11 of the first embodiment. The load beam 12A is different in shape from the load beam 12 of the first embodiment. The shape of the flexure 13A is different in shape from the flexure 13 of the first embodiment.

As shown in FIG. 8, a first load beam frame portion 121 is formed on one proximal portion 12c of the load beam 12A. The first load beam frame portion 121 is formed of a part of the load beam 12A. The first load beam frame portion 121 includes a first supporting portion 121a and a second supporting portion 121b. The first supporting portion 121a supports one end of a first actuator element 41. The second supporting portion 121b supports the other end of the first actuator element 41. An opening 122 is formed in the inside portion 121c of the first load beam frame portion 121. A terminal line 51c is arranged in the opening 122. A first slit 121e is formed in the outside portion 121d of the first load beam frame portion 121. The first slit 121e comprises a function to enable the actuator element 41 to extend and retract.

Figure 9:
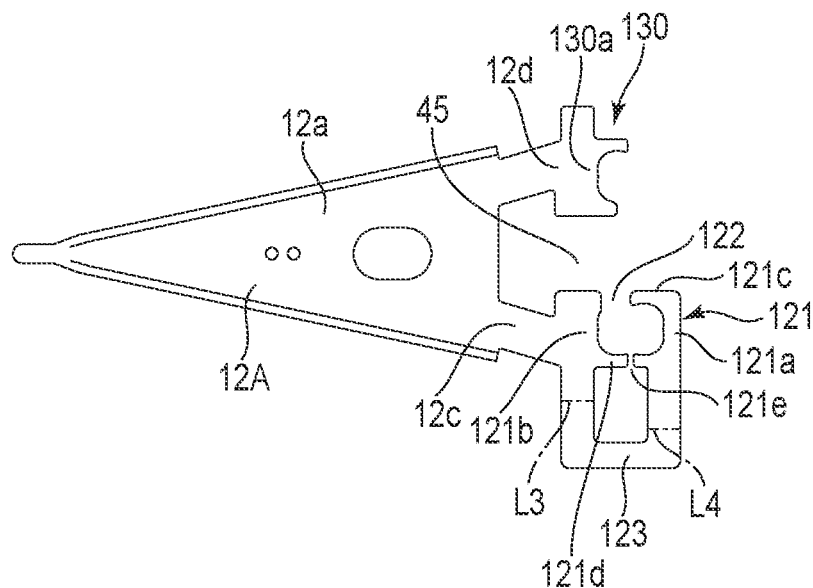
FIG. 9 is a plan view showing a load beam from which a connecting portion is not detached in the suspension shown in FIG. 8.

Before the load beam 12A is fixed to the baseplate 11, as shown in FIG. 9, the first supporting portion 121a and the second supporting portion 121b are connected to each other by a connecting portion 123. After the load beam 12A is fixed to the baseplate 11, the connecting portion 123 is cut at a place indicated by one-dot chain lines L3 and L4. The connecting portion 123 is thereby detached from the load beam 12A.

Figure 10:
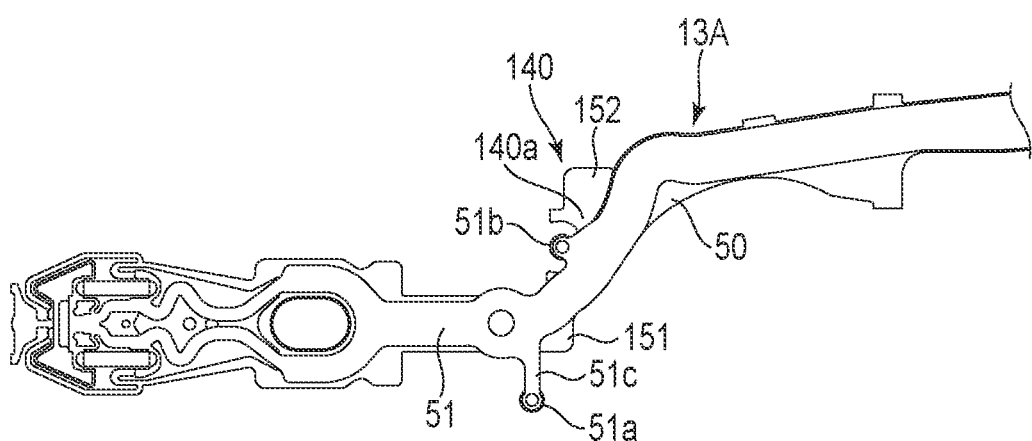
FIG. 10 is a plan view showing the flexure of the suspension shown in FIG. 8.

As shown in FIGS. 8 and 10, a thin plate frame portion 140 is formed on a metal base 50 of the flexure 13A. The thin plate frame portion 140 is formed of a part of the metal base 50. The thin plate frame portion 140 includes a portion 140a supporting one end of the second actuator element 42. A second slit 142 is formed between an outside portion of a second load beam frame portion 130 and an outside portion of a thin plate frame portion 140. The second slit 142 comprises a function to enable the second actuator element 42 to extend and retract.

The second load beam frame portion 130 is formed on the other proximal portion 12d of the load beam 12A. The second load beam frame portion 130 is formed of a part of the load beam 12A. The second load beam frame portion 130 includes a portion 130a which supports the other end of the second actuator element 42.

In the suspension 10A of the present embodiment, the load beam 12A and the flexure 13A are prevented from overlapping with each other in the actuator arrangement portions 71 and 72. Therefore, increase in the thickness of the actuator arrangement portions 71 and 72 could be suppressed.

Figure 11:
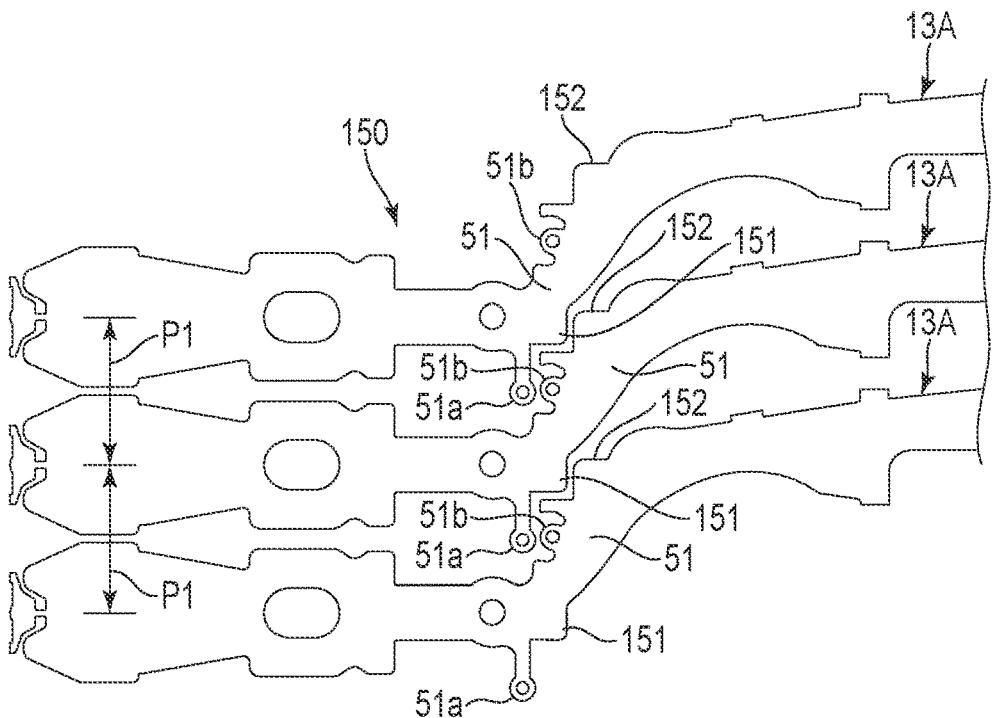
FIG. 11 is a plan view showing a flexure chain sheet in which a plurality of flexures shown in FIG. 10 are arranged adjacent to each other.

FIG. 11 shows a flexure chain sheet 150 in which a plurality of flexures 13A are arranged adjacent to each other. On one side of the wiring portion 51, the first terminal 51a and a protrusion 151 are formed. The first terminal 51a and the protrusion 151 each protrude to the one side of the flexure 13A.

On the other side of the wiring portion 51, a second terminal 51b and a protrusion 152 are formed. The second terminal 51b and the protrusion 152 each protrude to the other side of the flexure 13A. The first terminal 51a and the second terminal 51b are arranged at positions different from each other in the longitudinal direction of the flexure 13A. The one protrusion 151 and the other protrusion 152 are arranged at positions different from each other in the longitudinal direction of the flexure 13A.

FIG. 11 shows a state in which the plurality of flexures 13A are arranged in the lateral direction. According to the flexure 13A of the present embodiment, an interference between the first terminal 51a and the second terminal 51b can be avoided in the flexures 13A adjacent to each other. The interference between the one protrusion 151 and the other protrusion 152 can also be avoided. For this reason, an arrangement pitch P1 of the plurality of the flexures 13A could be made small. Therefore, in the manufacturing process of the flexure 13A, the number of the flexures 13A formed on a single flexure chain sheet 150 could be increased.

Fourth Embodiment

Figure 12:
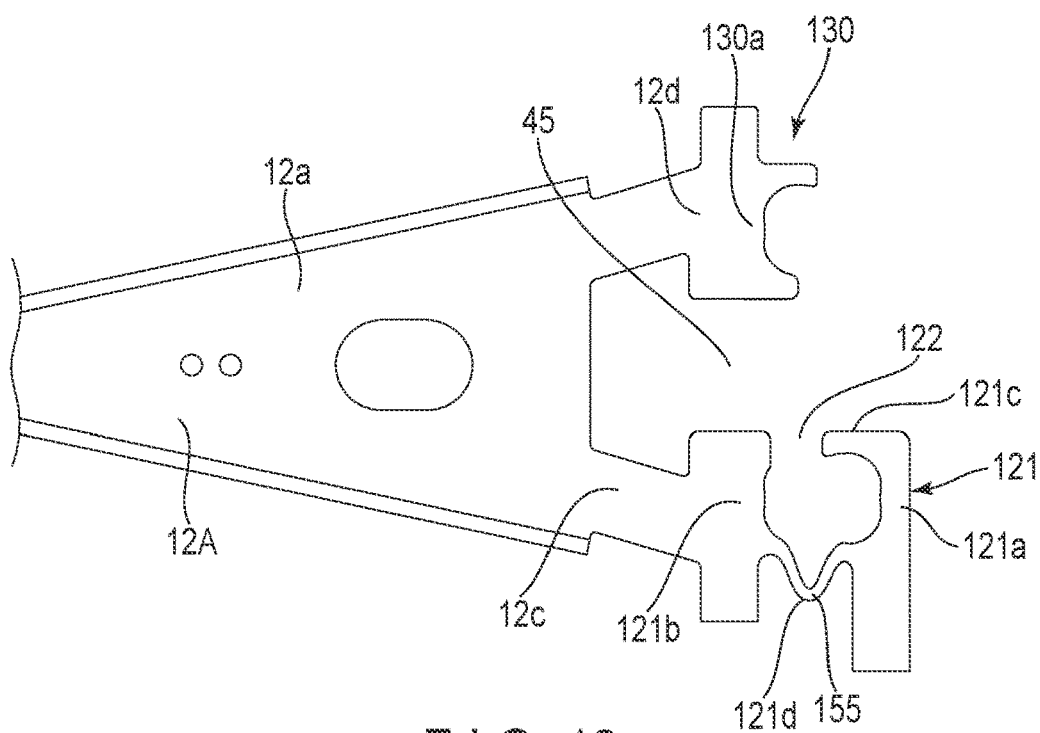
FIG. 12 is a plan view showing a part of a load beam of a suspension according to a fourth embodiment.

FIG. 12 is a plan view showing a part of a load beam 12A of a suspension of a fourth embodiment. As shown in FIG. 12, an outside portion 121d of a first load beam frame portion 121 is different in shape from the load beam 12A of the third embodiment (shown in FIG. 8). Since structures other than this are common to the structures of the load beam 12A of the third embodiment, portions common to the two embodiments are denoted by common reference numerals and their descriptions are omitted.

The outside portion 121d of the first load beam frame portion 121 shown in FIG. 12 includes a curved portion 155. The curved portion 155 comprises a function to enable the first actuator element 41 (shown in FIG. 8) to extend and retract. The curved portion 155 has an outwardly convex shape (e.g., V-shape, U-shape, Ω-shape or the like). The first load beam frame portion 121 of the present embodiment includes the curved position 155. According to this, the first supporting portion 121a and the second supporting portion 121b could be connected to each other without affecting the stroke of the actuator element 41.

Fifth Embodiment

Figure 13:
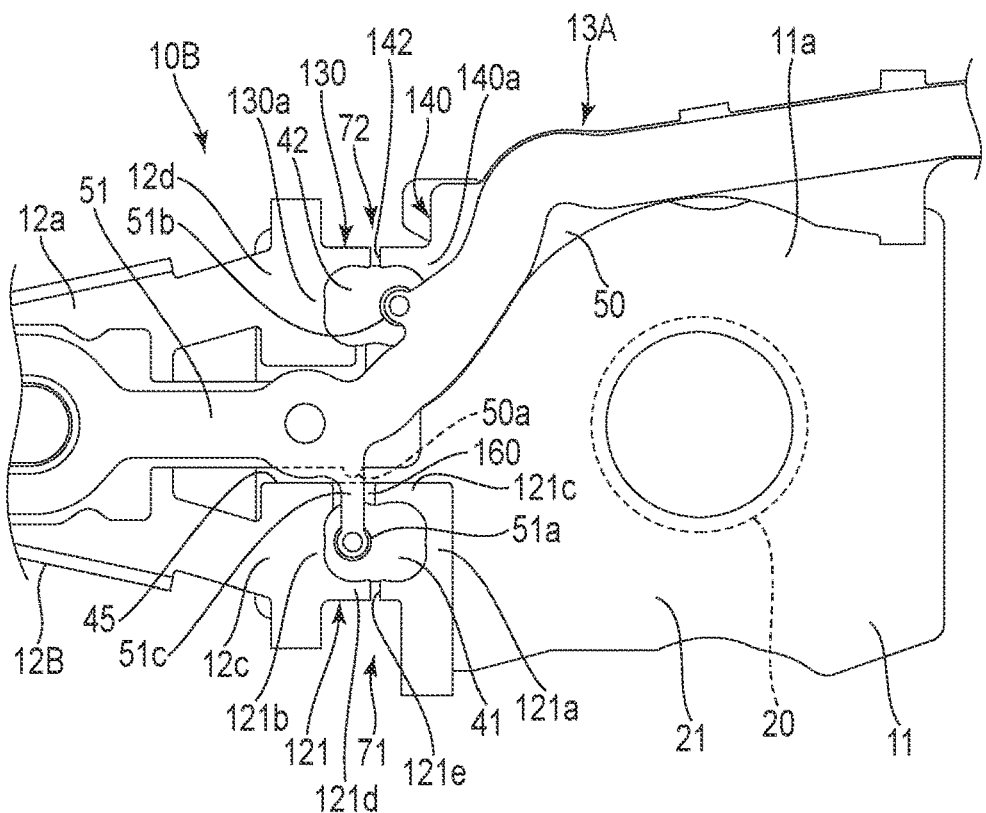
FIG. 13 is a plan view showing a part of a suspension according to a fifth embodiment.
Figure 14:
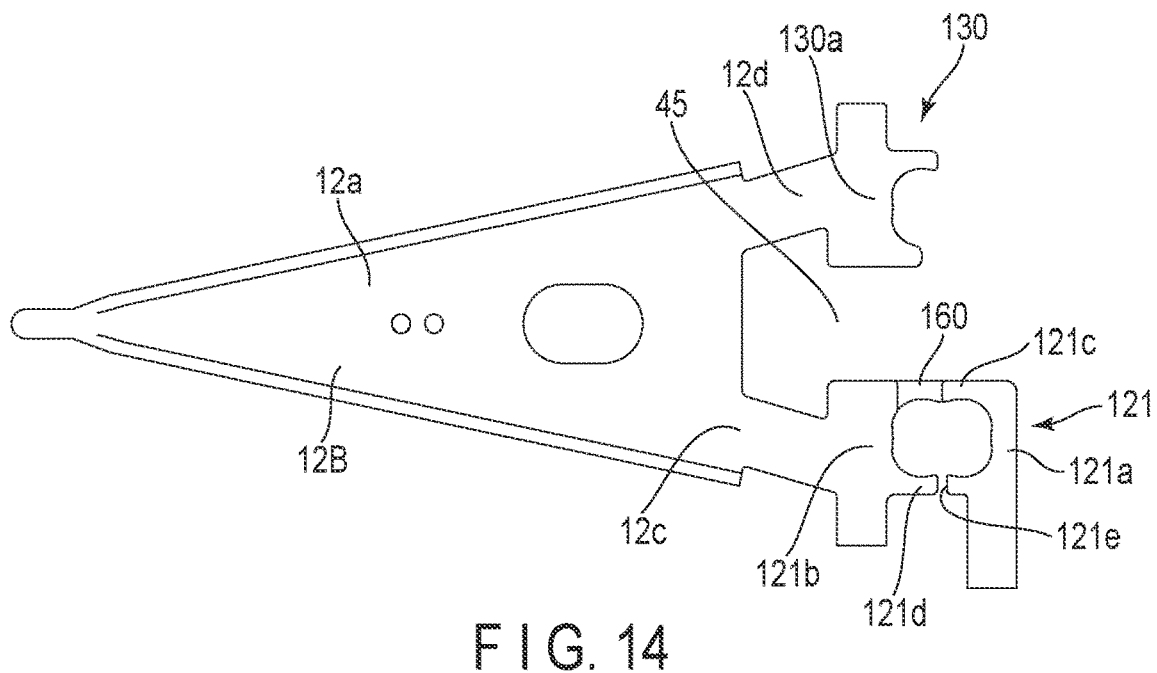
FIG. 14 is a plan view showing a load beam of the suspension shown in FIG. 13.

FIG. 13 is a plan view showing a part of a suspension 10B of a fifth embodiment. FIG. 14 is a plan view showing a load beam 12B of the suspension 10B shown in FIG. 13. The load beam 12B of the present embodiment is different from the load beam 12A of the third embodiment in including a thin portion 160. Since structures other than this are common to the structures of the suspension 10A of the third embodiment, portions common to the suspension 10A of the third embodiments are denoted by common reference numerals and their descriptions are omitted.

The load beam 12B according to the fifth embodiment includes the thin portion 160. The thin portion 160 is formed between the first supporting portion 121a and the second supporting portion 121b. The first load beam frame portion 121 is formed by the first supporting portion 121a and the second supporting portion 121b. The thin portion 160 can be formed by reducing the thickness of a part of the first load beam frame portion 121 by half etching. Alternatively, the thin portion 160 can be obtained by forming a part of the first load beam frame portion 121 by press working. As shown in FIG. 13, the terminal line 51c is arranged on the thin portion 160.

The terminal line 51c is arranged on the thin portion 160. Therefore, the increase in the thickness of the first actuator arrangement portion 71 including the first load beam frame portion 121 could be avoided. Further, the first supporting portion 121a and the second supporting portion 121b are connected to each other by the thin portion 160. Therefore, the separation of the first supporting portion 121a and the second supporting portion 121b can be avoided. Therefore, a connecting portion 123 shown in FIG. 9 is not needed, and a step for detaching the connecting portion 123 is not needed, either. The thickness of a second actuator arrangement portion 72 is small since the second load beam frame portion 130 and the flexure 13A do not overlap with each other.

As shown in FIG. 13, an edge 50a of the metal base 50 may not exist at a place where the terminal line 51c and the thin portion 160 overlap with each other. The thickness of the actuator arrangement portion 71 can thereby be further reduced. The thin portion 160 may not be formed between the first supporting portion 121a and the second supporting portion 121b. In this case, the metal base 50 is not provided on a place where the load beam frame portion 121 and the terminal line 51c overlap with each other. According to this, the thickness of the actuator arrangement portion 71 can be further reduced.

Sixth Embodiment

A suspension 10C according to a sixth embodiment will be described hereinafter with reference to FIGS. 15 to 17. With respect to this suspension 10C, portions common to those of any of the suspensions 10A and 10B of the embodiments are denoted by the reference numerals common to those of the embodiments and their descriptions will be omitted. The portions which are different from those of the suspensions of the embodiments will be described hereinafter.

Figure 15:
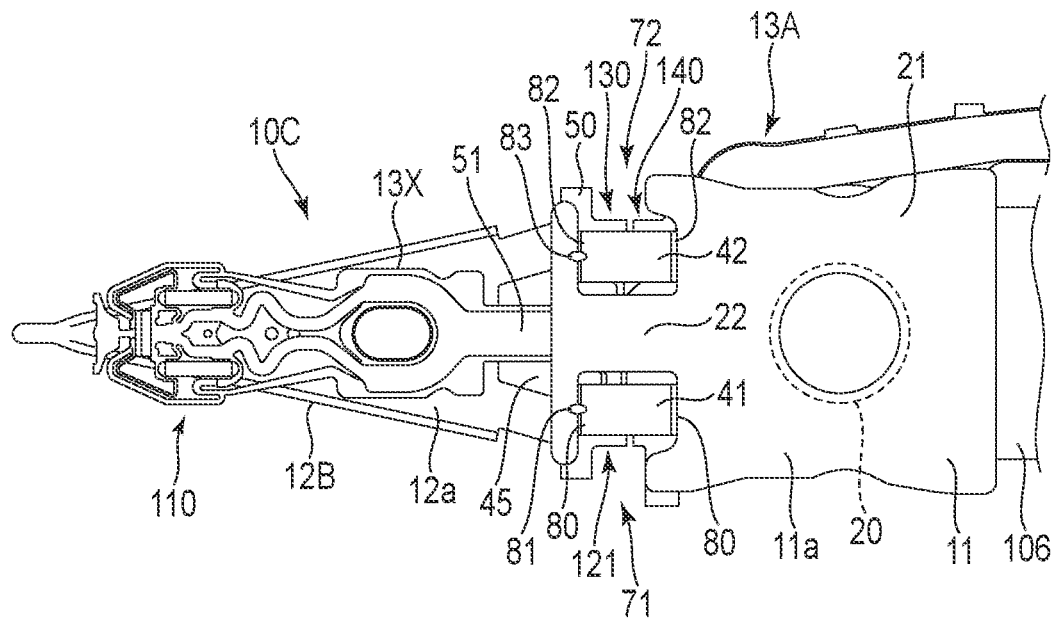
FIG. 15 is a plan view showing a suspension according to a sixth embodiment.
Figure 16:
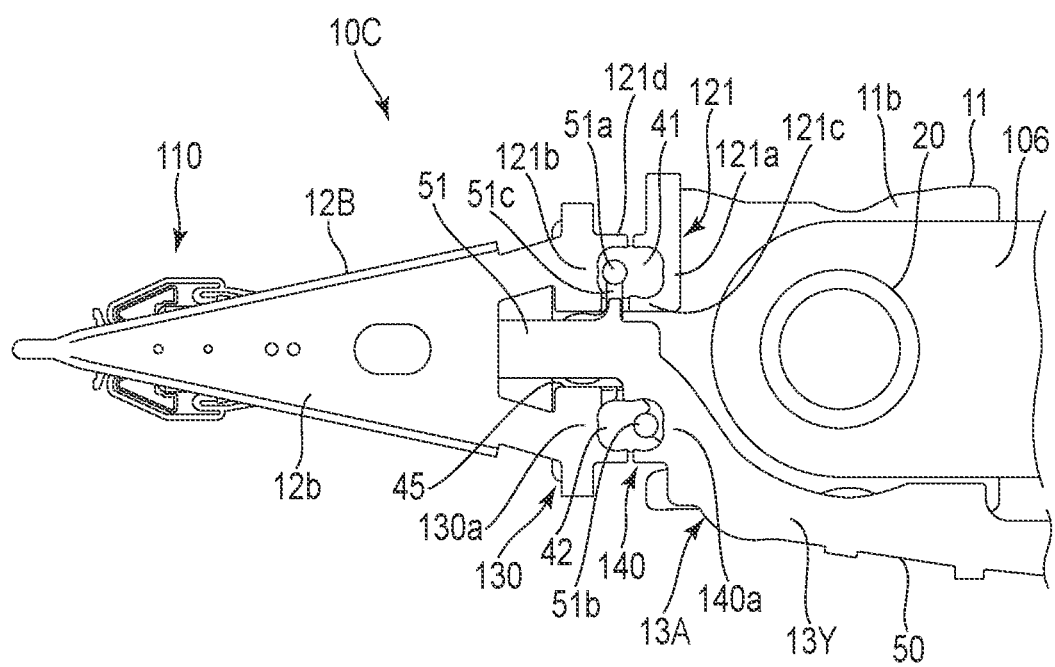
FIG. 16 is a plan view showing the suspension shown in FIG. 15 as seen from the side opposite to FIG. 15.

FIG. 15 is a plan view showing the suspension 10C. FIG. 16 is a plan view showing the suspension 10C viewed from the side opposite to FIG. 15. FIG. 17 schematically shows a cross-section of a baseplate 11 and a cross-section of a part of a flexure 13A. The flexure 13A of the present embodiment includes a first portion 13X (shown in FIG. 15) and a second portion 13Y (shown in FIG. 16) with respect to a longitudinal direction of the suspension 10C. The first portion 13X overlaps with a first surface 12a of a load beam 12B. The second portion 13Y overlaps with a second surface 11b of the baseplate 11.

As shown in FIG. 15, the first portion 13X of the flexure 13A is arranged along the first surface 12a of the load beam 12B. As shown in FIG. 16, the second portion 13Y of the flexure 13A passes through an opening 45 of the load beam 12B and protrudes toward a second surface 12b of the load beam 12B. A part of the second portion 13Y is fixed to the second surface 11b of the baseplate 11.

Figure 17:
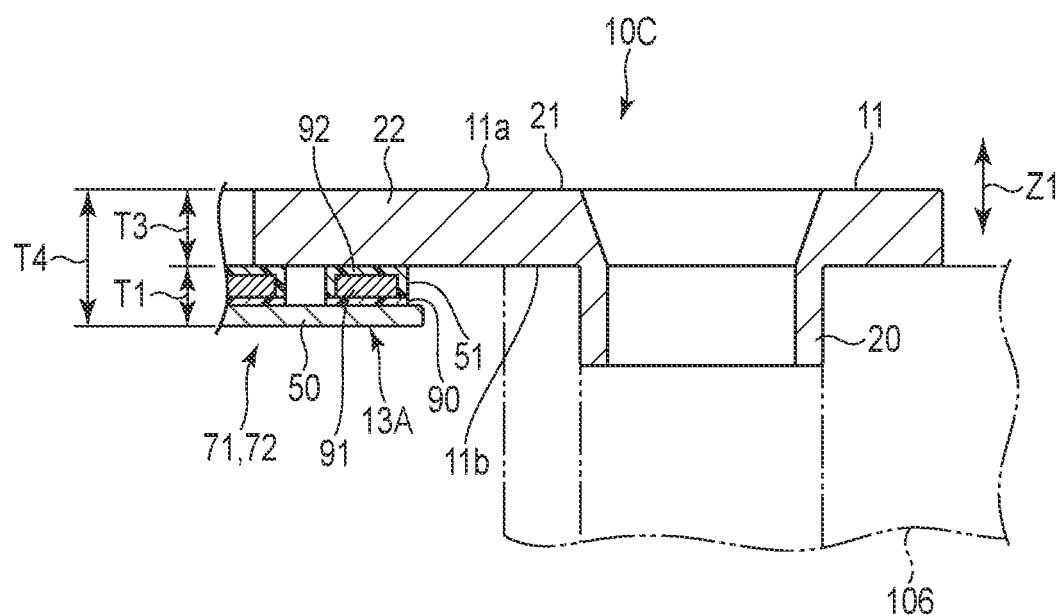
FIG. 17 is a cross-sectional view schematically showing a baseplate and a part of a flexure of the suspension shown in FIG. 15.

FIG. 17 is a cross-sectional view schematically showing the baseplate 11 and a part of the flexure 13A of the suspension 10C. Double-headed arrow Z1 in FIG. 17 indicates the thickness direction of the suspension 10C. The thickness T1 of the flexure 13 is a sum of the thickness of the metal base 50 and the thickness of the wiring portion 51. The thickness T4 of the actuator arrangement portions 71 and 72 is a sum of the thickness T1 of the flexure 13A and the thickness T3 of the baseplate 11.

In the suspension 10C of the present embodiment, the thickness T4 of the actuator arrangement portions 71 and 72 could be made smaller than conventional portions since the load beam and the flexure do not overlap with each other in the actuator arrangement portions 71 and 72, similarly to the suspensions 10, 10A and 10B of the first to fifth embodiments.

Needless to say, when carrying out the present invention, the specific forms of each of the elements constituting the suspension may be modified variously, such as the baseplate, the load beam, the flexure, the actuator arrangement portion, and the like. In addition, the metal base, the wiring portion, the thin plate frame portion in the flexure, the load beam frame portion and the like can be carried out in various forms.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk drive suspension comprising:
   a baseplate;
   a load beam fixed to the baseplate;
   a flexure provided along with the load beam;
   a first actuator arrangement portion on which a first actuator element is arranged; and
   a second actuator arrangement portion on which a second actuator element is arranged,
   wherein:
   the flexure comprises a metal base smaller in thickness than the load beam, and a wiring portion arranged along with the metal base,
   the first actuator arrangement portion comprises a first thin plate frame portion formed of a part of the metal base of the flexure, the first thin plate frame portion being arranged at a position not overlapping with the load beam to support the first actuator element, and the first thin plate frame portion comprising (i) a first end portion supporting one end of the first actuator element, (ii) a second end portion supporting another end of the first actuator element, (iii) a first inside portion extending along an inner side of the first actuator element, and (iv) a first outside portion extending along an outer side of the first actuator element, and
   the second actuator arrangement portion comprises a second thin plate frame portion formed of a part of the metal base of the flexure, the second thin plate frame portion being arranged at a position not overlapping with the load beam to support the second actuator element, and the second thin plate frame portion comprising (i) a third end portion supporting one end of the second actuator element, (ii) a fourth end portion supporting another end of the second actuator element, (iii) a second inside portion extending along an inner side of the second actuator element, and (iv) a second outside portion extending along an outer side of the second actuator element.

2. The disk drive suspension of claim 1, wherein:
   the first outside portion of the first thin plate frame portion includes a first slit enabling the first actuator element to extend and retract, and
   the second outside portion of the second thin plate frame portion includes a second slit enabling the second actuator element to extend and retract.

3. The disk drive suspension of claim 1, wherein:
   the first outside portion of the first thin plate frame portion includes a first curved portion enabling the first actuator element to extend and retract, and
   the second outside portion of the second thin plate frame portion includes a second curved portion enabling the second actuator element to extend and retract.

4. The disk drive suspension of claim 1, wherein:
   the load beam includes:
      a first surface; and
      a second surface opposite to the first surface, and
   the flexure includes:
      a first portion overlapping the first surface of the load beam; and
      a second portion passing through an opening of the load beam, protruding toward the second surface, and overlapping with the baseplate.

* * * * *